April 25, 1939.  O. J. PARKS ET AL  2,155,735

FEED MECHANISM FOR PLANTERS

Original Filed Oct. 31, 1936  2 Sheets-Sheet 1

INVENTORS
ORVILLE J. PARKS
MARTIN RONNING
BY Andrew E. Carlsen
ATTORNEY.

April 25, 1939.    O. J. PARKS ET AL    2,155,735
FEED MECHANISM FOR PLANTERS
Original Filed Oct. 31, 1936    2 Sheets-Sheet 2

INVENTORS
ORVILLE J. PARKS
MARTIN RONNING
BY
*Andrew E. Carlsen*
ATTORNEY.

Patented Apr. 25, 1939

2,155,735

UNITED STATES PATENT OFFICE 2,155,735

FEED MECHANISM FOR PLANTERS

Orville J. Parks, Hopkins, and Martin Ronning, St. Louis Park, Minn., assignors to Minneapolis-Moline Power Implement Company, Minneapolis, Minn., a corporation of Delaware Original application October 31, 1936, Serial No. 108,552. Divided and this application August 20, 1937, Serial No. 160,088

1 Claim. (Cl. 111—34).

This invention relates to seed dropping mechanisms for seed planting machinery such as used for planting beets, beans, radishes, lettuce, and other farm and garden products which are generally planted in crop rows.

The primary object of the invention is to provide a seed dropping mechanism wherein is embodied a seed boot for dropping the seed and a valve or valve gate for controlling the discharge of the seeds from the boot, the said valve being, according to this invention, slidably mounted into the boot in such manner that it will have a wiping action on the boot, thus making the valve self-cleaning in operation. Any sticking or clogging of the valve will thus be positively prevented.

Another and important object is to provide a novel and advantageous form of control mechanism for the seed control valve, and which mechanism may be readily arranged and adapted for either hill drop planting or check row planting. The former method, which is controlled by the travel of the planter over the field, plants the hills in even spacing along the row, but does not necessarily align the hills transversely or from row to row while the later method, which is controlled by a check wire stretched across the field, aligns the hills from row to row so as to permit cross cultivation in well known manner.

These and still other more detailed and specific objects will be disclosed in the course of the following specification, reference being had to the accompanying drawings, wherein.

Figure 1:
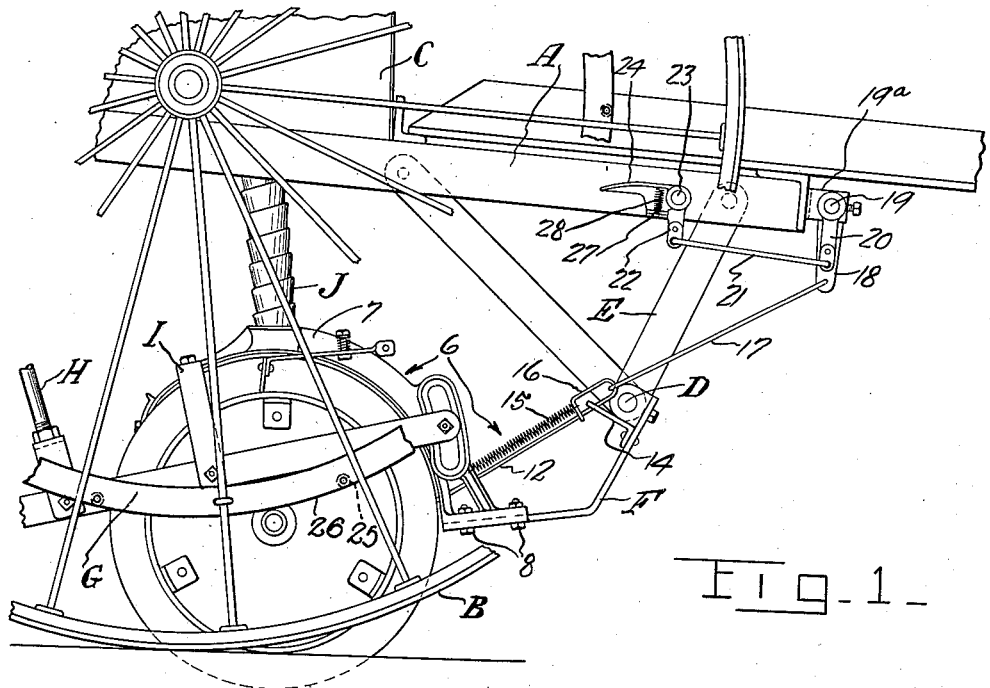
Fig. 1 is a fragmental side elevation of a planter showing the seed dropping mechanism in use thereon.

It may be noted at this point that this application is a division of our parent application filed October 31st, 1936, under Serial No. 108,552, for Planter.

Referring now with more particularity to the drawings, the reference character A designates generally a planter frame which is borne by a wheel B at each side and includes the seed box C for carrying the seed. A cross bar D is supported transversely of the frame A and forwardly and below the seed box C by means of braces E, and it is to this bar that the seed dropping mechanisms are connected and arranged in any desired spacing transversely of the machine. For supporting each of the seed dropping mechanisms there is provided a drag bar F pivoted to the cross bar D and also spaced side bars G rearwardly extended and supported by a fork and rod assembly H, which is extended upwardly and associated with a lifting mechanism (not shown) for raising and lowering the seed dropping mechanism. In this operation the entire assembly oscillates about the cross bar D as an axis. The foregoing and other illustrated supporting parts and their arrangement are specifically recited in our copending application Serial No. 108,552, hereinbefore referred to.

The present invention relates to the seed dropping mechanisms, only one of which is here shown, designated generally at 6 in the drawings. A casting 7 is provided and is supported at its frontal end by connection at 8 to the drag bar F, and is located and supported between the side bars G by a bail-shaped hanger I. This casting includes the depending tubular boot 9 through which the seed is adapted to be dropped to the ground, the seed being led to the boot by the flexible ribbon tube J.

For controlling the passage of the seed through the boot 9 we provide the valve or valve gate 10 slidably mounted through a slot 11 cut in one wall of the boot adjacent to its lower end. While the valve is shown as mounted through the frontal wall portion of the boot it is obvious that it might be mounted through any other portion if so desired. However mounted, the valve is of such shape and size that, when pushed inwardly into the boot, it will completely close the passageway therethrough so as to block off the seed in the boot. Then by drawing the valve outwardly the passageway will be cleared to drop the seed.

It may be stated at this point that this sliding action of the valve is a very important feature of the invention in that the margins of the slot 11 exert a wiping effect on the valve such as will make it self-cleaning and prevent its becoming clogged or otherwise impeded in its operation such as might occur should there be any moisture in the boot.

The valve 10 is actuated by means of a rod 12 connected to the exposed end of the valve and extended forwardly through a guide opening 13 in the casting 7 and then slidably through a bracket 14 secured to the drag bar F. A retractile coil spring 15 is stretched between the casting 7 and a loop 16 found at the frontal end of the rod 12, in such manner that it normally holds the valve in closed position, and of course returns it to that position after it has been opened by a forward pull on the rod. A rod or connecting link 17 pivotally engages the loop 16 and extends forwardly where it is connected to a crank or arm 18 secured to a shaft 19 journaled transversely across the frame A in bearings 19ª. It will be noted that the flexible or pivotal connection between the rod 12 and link 17 will permit vertical movement of the seed dropping assembly about the cross rod D without interfering in any way with the operation of the valve. This operation is of course brought about by oscillation of the shaft 19 which results in reciprocation of the rod 12 and link 17 such as will cause the valve to open and close.

Figure 2:
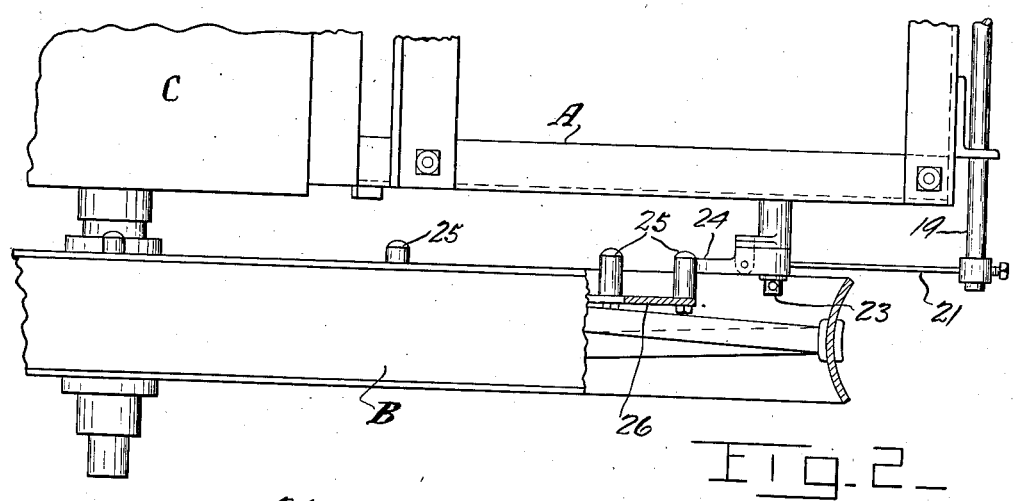
Fig. 2 is an enlarged fragmentary plan view, partially in section, showing the control mechanism for the seed dropping valve arranged for hill drop planting.
Figure 3:
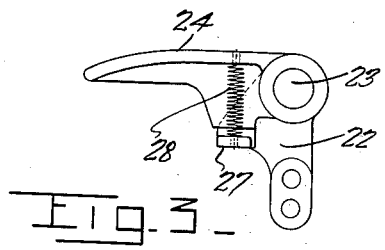
Fig. 3 is an enlarged side elevation of the wheel trip unit alone.

The shaft 19 is operated to bring about this action by either of two mechanisms selectively employed according to the kind of planting to be done. The mechanism illustrated in Figs. 1, 2, and 3 is that used for so called hill drop planting, and comprises an arm or crank 20 depended from the end of the shaft 19 and connected by a link 21 to an arm 22 which is pivotally mounted on the main frame as at 23. The same pivot supports a trigger or actuating arm 24 which projects rearwardly and is adapted to be engaged at its free rear end by a series of pins 25 which project inwardly from the adjacent wheel B. These pins 25 are preferably attached in evenly spaced relationship to an annular band or ring 26 that is secured to the wheel concentrically therewith. The assembly is such that when the trigger 24 is pushed downwardly under the impulse of one of the pins 25 striking it as the wheel A rotates forwardly, the trigger will strike the stop 27 on the arm 22 and thereby push the link 21 and arm 20 forwardly to oscillate the shaft 19. This action will in turn operate the link 17 and rod 12 to open the seed valve 10 and produce the desired intermittent dropping of the seed from the boot 9. The pins 25 may of course be spaced as desired on the band 26 in order to produce the required distance between plantings along the row.

While the arm 22 and trigger 24 move in unison under normal operating conditions, it will be noted that they are independently pivoted on the same pin 23 and are yieldingly held together by a spring release arrangement comprising a retractile coil spring 28 arranged as shown. This spring will permit the trigger to move upwardly at its free end without actuating the arm 22, and this arrangement will prevent breakage and permit the pins 25 to move upwardly under the trigger should the planter be inadvertently or otherwise moved in a rearward direction.

Figure 4:
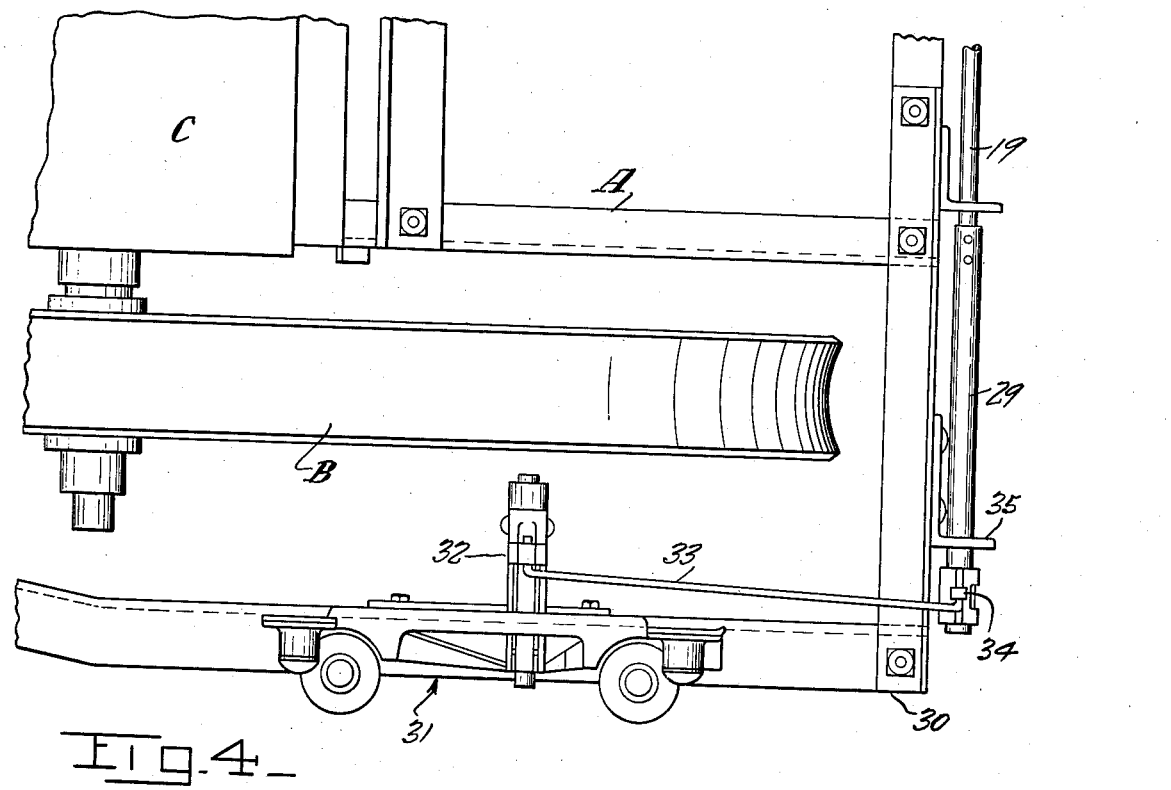
Fig. 4 is a plan view similar to Fig. 2, but having the control mechanism arranged for check row planting.
Figure 5:
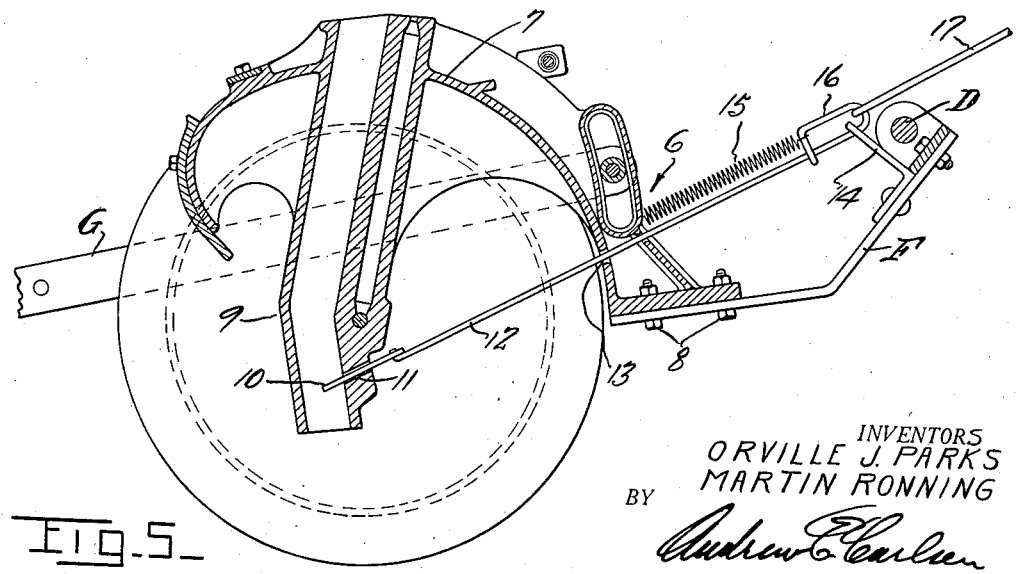
Fig. 5 is an enlarged sectional elevation through the planter boot and associated parts, showing a part of the control mechanism for the seed dropping valve.

When the machine is to be used for check row planting, the trigger mechanism 22 and 24 is removed or disconnected from the shaft 19, and in place thereof an extension 29 is applied to the end of the shaft, as shown in Fig. 4. In this case also a frame extension 30 is provided and attached to the frame A so that it extends out laterally beyond the adjacent wheel B. A tripping unit designated generally at 31 is then supported on this frame extension 30 and is of any conventional type generally employed in connection with a check wire (not shown), wherein the unit is tripped intermittently by means of stops spaced along the wire. In the particular arrangement shown in the drawings this tripping action results in the rearward movement of the arm 32, and as this arm is connected by a link 33 to an arm 34 on the shaft extension the intermittent tripping action causes a concurrent oscillation of the shaft 19 such as will cause the valve 10 to open and close. The shaft extension 29 is preferably journaled in a bracket 35 on the frame extension 30 and may be readily removed from the shaft 19 when the frame extension is removed from the main frame A.

It is thought that the operation of the two forms of valve actuating mechanisms will be apparent from the foregoing, and it is evident that by a readily made alteration the same planter may be used for either hill crop or check row planting.

It is understood that modifications may be made in the structure disclosed, provided they do not depart from the spirit or scope of the appended claim. Having thus fully described and illustrated the invention, what we claim as new and desire to secure by Letters Patent is:

A seed dropping mechanism for a planter including a wheel borne frame, and comprising, in combination, a seed dropping unit including a seed boot having a passageway for the seed, a drag bar extended forwardly from the seed boot and pivotally connected to the frame for supporting the boot for vertical movement with respect to the frame, a seed box on the frame, a flexible tube connecting the seed box and seed boot for carrying seed to the passageway in the boot, a seed valve slidably mounted through a frontal portion of the seed boot and movable therein for opening and closing the passageway through the boot, the said seed dropping unit including also a member extended and spaced forwardly from the valve and having a guide opening, an operating rod connected to the valve and slidably extended forwardly through the guide guide opening above the drag bar, an elongated loop formed on the frontal end of the rod and disposed to the rear of the pivotal connection about which the drag bar swings, spring means for normally retaining the seed valve in closed position, a guide bracket secured to the drag bar and slidably engaging the loop on the operating rod, and operating means including a movable link connected to the said loop for periodically pulling the operating rod and opening the valve.

ORVILLE J. PARKS.
MARTIN RONNING.